(12) United States Patent
Børøy et al.

(10) Patent No.: US 11,962,223 B2
(45) Date of Patent: Apr. 16, 2024

(54) APPARATUS FOR SUPPORTING A FLYWHEEL ON A FLOATING VESSEL AND METHODS THEREOF

(71) Applicant: National Oilwell Varco Norway AS, Kristiansand S (NO)

(72) Inventors: Yngvar Børøy, Søgne (NO); Anibal B. Teixeira, Kristiansand (NO); Geir Odd Bergstøl, Brennåsen (NO); Oddbjørn Øye, Kristiansand (NO)

(73) Assignee: Grant Prideco, Inc., Houston, TX (US)

( * ) Notice: Subject to any disclaimer, the term of this patent is extended or adjusted under 35 U.S.C. 154(b) by 201 days.

(21) Appl. No.: 16/954,629

(22) PCT Filed: Dec. 21, 2018

(86) PCT No.: PCT/NO2018/050329
§ 371 (c)(1),
(2) Date: Jun. 17, 2020

(87) PCT Pub. No.: WO2019/125180
PCT Pub. Date: Jun. 27, 2019

(65) Prior Publication Data
US 2020/0313507 A1    Oct. 1, 2020

(30) Foreign Application Priority Data

Dec. 22, 2017 (EP) .................... 17209919

(51) Int. Cl.
| | |
|---|---|
| *H02K 7/00* | (2006.01) |
| *E21B 19/00* | (2006.01) |
| *H02K 7/02* | (2006.01) |
| *B63B 35/44* | (2006.01) |
| *E21B 19/09* | (2006.01) |
| *H02K 7/09* | (2006.01) |

(52) U.S. Cl.
CPC ........... *H02K 7/025* (2013.01); *E21B 19/006* (2013.01); *B63B 35/4413* (2013.01); *E21B 19/09* (2013.01); *F16C 2361/55* (2013.01); *H02K 7/09* (2013.01)

(58) Field of Classification Search
CPC ........ H02K 7/025; H02K 7/09; E21B 19/006; E21B 19/09; B63B 35/4413; F16C 2361/55
(Continued)

(56) References Cited

U.S. PATENT DOCUMENTS

| | | |
|---|---|---|
| 3,390,654 A | 7/1968 | Bromell et al. |
| 4,337,715 A | 7/1982 | de Pingon |

(Continued)

FOREIGN PATENT DOCUMENTS

| | | | |
|---|---|---|---|
| GB | 2150516 A | | 7/1985 |
| JP | 2012087643 A | * | 5/2012 |

(Continued)

OTHER PUBLICATIONS

International Search Report for PCT/NO2018/050329 dated Mar. 14, 2019 (3 pages).
(Continued)

*Primary Examiner* — Matthew R Buck
*Assistant Examiner* — Patrick F Lambe
(74) *Attorney, Agent, or Firm* — Conley Rose, P.C.

(57) ABSTRACT

An apparatus for supporting a flywheel on a floating vessel includes a support for the flywheel; and a tilt sensor for measuring an angle of slope relative to the Earth, the tilt sensor being arranged to detect a change of an angle of slope of the floating vessel relative to the Earth. The apparatus further includes a driver for manoeuvring the support relative to the floating vessel, based on the measured angle of slope from the tilt sensor, wherein the driver is operable to
(Continued)

manoeuvre the support so as to counteract a change of an angle of slope of the flywheel relative to the Earth due to the detected change of an angle of slope of the floating vessel.

19 Claims, 3 Drawing Sheets

(58) Field of Classification Search
USPC .......................................................... 310/74
See application file for complete search history.

(56) References Cited

U.S. PATENT DOCUMENTS 5,207,408 A    5/1993    Burg

2008/0303363 A1*   12/2008   Alston ................... B63B 39/04
                                                                  310/74
2010/0314168 A1    12/2010   Williams
2019/0367138 A1*   12/2019   Smith .................... B63B 39/04

FOREIGN PATENT DOCUMENTS

| JP | 2015217941 A | * | 12/2015 | |
| WO | 2013055300 | | 4/2013 | |
| WO | WO-2013055300 A1 | * | 4/2013 | ............. B63B 17/00 |

OTHER PUBLICATIONS

Written Opinion for PCT/NO2018/050329 dated Mar. 14, 2019 (7 pages).
Extended European Search Report for EP 17209919.4 (9 pages).
Examination Report dated May 27, 2021, for European Application No. 17209919.4.

* cited by examiner

APPARATUS FOR SUPPORTING A FLYWHEEL ON A FLOATING VESSEL AND METHODS THEREOF

This application is a 35 U.S.C. § 371 national stage application of PCT/NO2018/050329 filed Dec. 21, 2018 and entitled "Apparatus for Supporting a Flywheel on a Floating Vessel and Methods Thereof", which claims priority to European Patent Application No. 17209919.4 filed Dec. 22, 2017, each of which is incorporated herein by reference in their entirety for all purposes

STATEMENT REGARDING FEDERALLY SPONSORED RESEARCH OR DEVELOPMENT

Not applicable

FIELD OF THE DISCLOSURE

The present disclosure relates to the field of providing a flywheel on a floating vessel. In particular, it relates to an apparatus for supporting a flywheel on a floating vessel, to methods of operating the apparatus, and to applications of such apparatus and methods.

BACKGROUND

Nowadays, a drillship typically carries at least one system which consumes energy in a non-continuous manner. An example of such a system is a lifting system for manoeuvring a drill string during a drilling operation, in which the lifting system is controlled by a heave compensation system. The lifting system has a non-continuous consumption of energy, which presents difficulties to a power system supplying energy to the lifting system. One of the difficulties is that the power system may not be capable, on its own, to supply a high-power transient. In some cases, even if the power system is capable, the transient is a substantial disruption to the power supply, having consequences, for example, in the supply to other systems on the vessel. For example, it is difficult to maintain a constant illumination of the drillship when the lifting system lifts a drill string to compensate for a heave motion. Another difficulty is the degradation of the power system due to the irregular consumption of energy, which can have expensive consequences. In sum, the lifting system has a variable energy consumption, and this may have consequences for the other systems that are connected to the system; thus, the energy supply must vary in a corresponding way.

A solution to handle a non-continuous consumption of energy is to use a flywheel, which can store any excess energy and then supply the energy stored when needed. Many drillships, nowadays, carry at least one flywheel for storing energy as kinetic energy. Energy is transferred to the flywheel by the application of a torque to it, thereby increasing its rotational speed, and thus its stored energy. Conversely, the flywheel releases the stored energy by transferring torque to a load, thereby decreasing the flywheel's rotational speed. This exchange of energy is achieved, for example, by making use of an electric motor and/or generator. Some of the benefits of using a flywheel for storing energy are the following: with routine maintenance, a flywheel may achieve an operating life of at least 20 years; a flywheel has a small physical footprint and a weight that makes it suitable for being used in spaces such as upper floors or unreinforced raised flooring. No special ventilation or emissions control is needed for a flywheel. A flywheel is known to be reliable and typically it is the energy storage means chosen for data centres, hospitals, defence facilities, or telecom applications.

The use of at least one flywheel for the purposes of handling a non-continuous consumption of energy, is observed on other kinds of floating vessels other than a drillship. An example is a floating drill rig including at least one flywheel for the purposes of better handling the energy consumption from a set of thrusters for the dynamic positioning of the drill rig. Another example is an aircraft carrier including at least one flywheel for the purposes of better handling the energy consumption of an electromagnetic aircraft launch system.

Thus, the use of a flywheel to store excess energy in a floating vessel and then supplying the stored energy when needed, is an effective technique for handling a non-continuous consumption of energy. However, it is challenging to operate a flywheel in a floating vessel and, concurrently, achieve a prolonged storage of energy or the storage of a substantial amount of energy in comparison to what would be achieved by operating the same flywheel on land.

When operating a flywheel on a floating vessel, certain drawbacks are observed. The forces changing the orientation of the rotation axis of the flywheel are much greater than the ones observed on a flywheel operated on land, where the main force observed is the force exerted by the rotation of the earth. In the case of a flywheel running on a floating vessel, there are further forces that result from the motions of the floating vessel, such as irregular changes on the pitch, roll or yaw of the floating vessel. These changes occur due to, for example, the motion of the waves or the wind. Consequently, one of the main concerns when operating a flywheel on a floating vessel is the robustness of the bearings on which the flywheel rotates, due the gyroscopic forces of the flywheel opposing these changes. In particular, the following considerations are known.

A proper operation of the flywheel only occurs if the bearings do not fail. Therefore, a maximum rotation speed is typically defined with regard to the moment of inertia of the flywheel and also to the expected changes of orientation of the floating vessel. This constraint keeps the flywheel operating without failing, but it directly restricts the capacity of the flywheel to store energy and, indirectly, the applications in which it can be used. Furthermore, even if the bearings are able to endure through gyroscopic forces of the flywheel produced above a strict maximum rotation speed, such an operation still produces friction that results on the flywheel losing speed and energy. Thus, a charged flywheel being operated on a floating vessel, besides storing a small amount of energy in comparison to what is achievable without the constraint, may also lose energy quickly.

With the aim of overcoming the constraints imposed by the maximum rotation speed, it may be possible to partially circumvent this constraint by increasing the number of flywheels in a floating vessel and, consequently, expanding the energy storage capacity. However, this approach is expensive and impractical due to the increase of the number of flywheels in the floating vessel. Alternatively, it is also known that the maximum rotation speed can be increased by providing a stronger bearing means for bearing the rotation of the flywheel. However, this solution is expensive and still has the problem that the flywheel is disturbed by the changes in orientation exerted by the motions of the floating vessel, hence losing energy in that way.

SUMMARY OF THE DISCLOSURE

According to an aspect of the disclosure, there is provided an apparatus for supporting a flywheel on a floating vessel, the apparatus comprising: a support for the flywheel; at least one tilt sensor for measuring an angle of slope relative to the Earth, the at least one tilt sensor being arranged to detect a change of an angle of slope of the floating vessel relative to the Earth; and at least one driver for manoeuvring the support relative to the floating vessel, based on the measured angle of slope from the at least one tilt sensor, wherein the at least one driver is operable to manoeuvre the support so as to counteract a change of an angle of slope of the flywheel relative to the Earth due to the detected change of an angle of slope of the floating vessel.

The inventors of the invention claimed below realized that what is required is an apparatus to counteract changes of an angle of slope of the flywheel due to a change of an angle of slope of the floating vessel. This idea goes against the conventional approach of addressing the shortcomings of operating a flywheel on a floating vessel by proposing changes to the flywheel or by increasing the number of flywheels on the floating vessel. According to exemplary embodiments disclosed herein, there is a flywheel on a floating vessel and if the floating vessel is affected in such a way that a change in an angle of slope is observed, the flywheel is manoeuvred relative to the floating vessel in order to counteract the influence of the floating vessel.

At least one tilt sensor may be arranged to measure an angle of slope of the floating vessel relative to the Earth. This arrangement allows the at least one driver to manoeuvre the support based on a measurement of the angle of slope of the floating vessel from the at least one tilt sensor.

At least one tilt sensor may be arranged to measure an angle of slope of the support relative to the Earth. This arrangement allows the at least one driver to manoeuvre the support based on a measurement of the angle of slope of the support from the at least one tilt sensor.

The at least one driver may comprise an extending member to manoeuvre the support relative to the floating vessel. This a simple and precise means for manoeuvring the support relative to the floating vessel.

The apparatus may comprise at least one pivot shaft for turning the support relative to the floating vessel.

According to another aspect of the disclosure, there is provided a method of operating an apparatus as described above, wherein the apparatus is for use on a floating vessel and comprises a support for a flywheel, the method comprising: measuring an angle of slope of the floating vessel relative to the Earth; obtaining an angle of slope of the support relative to the floating vessel, based on the measured angle of slope and on a target angle of slope for the support to obtain relative to the Earth; and manoeuvring the support relative to the floating vessel so as to obtain the obtained angle of slope.

Also, according to an aspect of the disclosure, there is provided a method of operating an apparatus as described above, wherein the apparatus is for being used on a floating vessel and comprises a support for a flywheel, the method comprising: measuring an angle of slope of the support relative to the Earth; obtaining a change of angle of slope of the support, based on the measured angle of slope and on a target angle of slope for the support to obtain relative to the Earth; manoeuvring the support relative to the floating vessel so as to perform the obtained change of angle of slope.

According to an aspect of the disclosure, there is provided a floating vessel, comprising an apparatus as described above. The apparatus may comprise at least one driver arranged to manoeuvre the support relative to the floating vessel so that the manoeuvre is based on a rotation axis parallel to the roll axis of the floating vessel. Also, the apparatus may comprise a support for a flywheel and a pivot shaft for turning the support relative to the floating vessel, the pivot shaft being arranged with a rotation axis parallel to the roll axis of the floating vessel. Furthermore, the support may be adapted to support the flywheel with a rotation axis parallel to the pitch axis of the floating vessel. Moreover, the floating vessel may be a drillship.

According to another aspect of the disclosure, there is provided a device, comprising: a flywheel; and an apparatus for supporting the flywheel in a floating vessel, wherein the apparatus is the apparatus described above.

BRIEF DESCRIPTION OF THE DRAWINGS

The figures in the drawing(s) will now be briefly described, in which.

DETAILED DESCRIPTION OF THE DISCLOSED EXEMPLARY EMBODIMENTS

Figure 1:
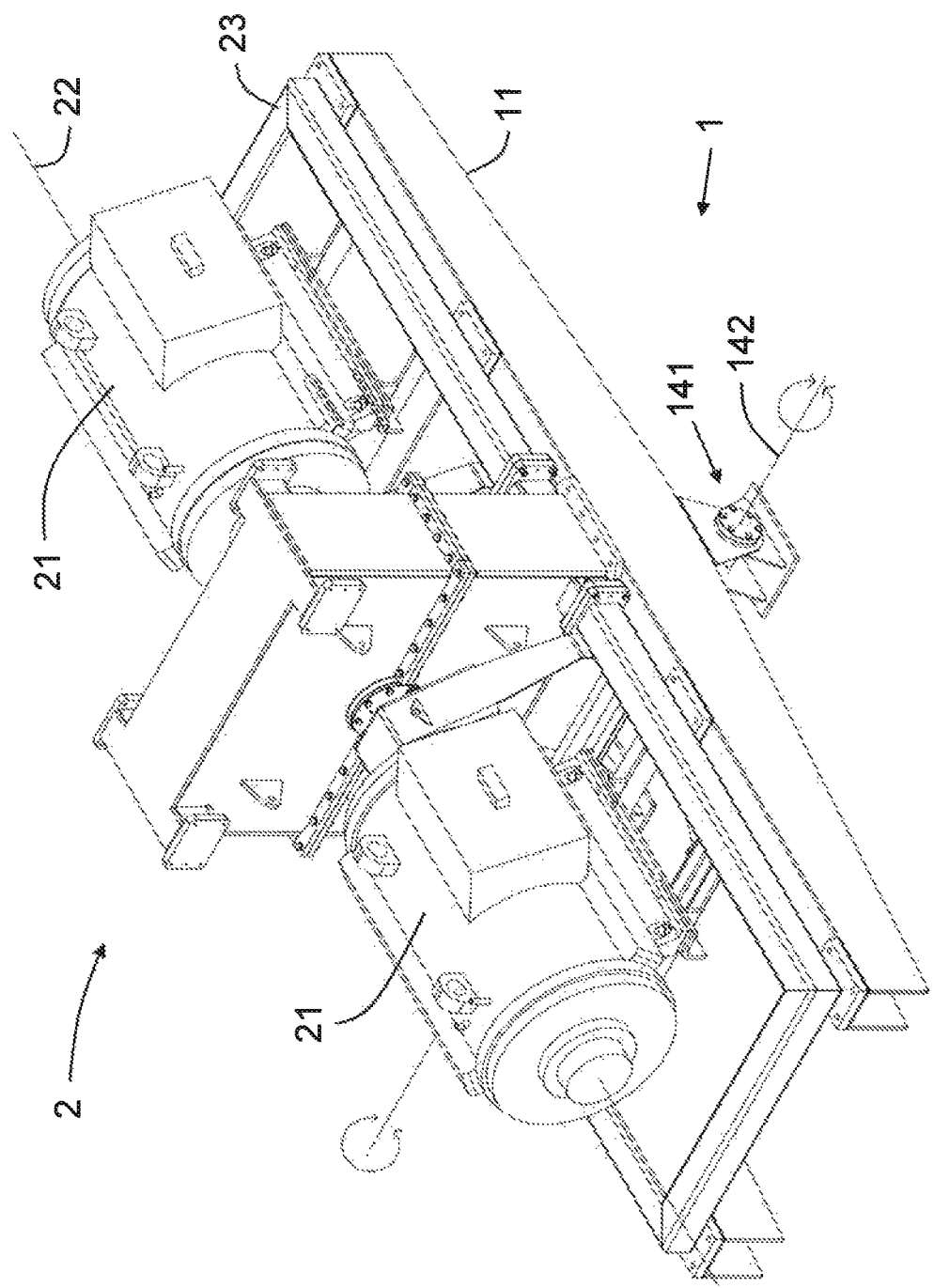
FIG. 1 is a schematic perspective view of an apparatus according to an exemplary embodiment.

At least one specific non-limiting way of carrying out the disclosure will now be described in detail, using examples where appropriate and referring to the drawings.

FIG. 1 shows a schematic perspective view of an apparatus 1 supporting a flywheel 2. The flywheel 2 may be used for storing electric energy in the form of kinetic energy. The electric energy is received to or provided from the flywheel 2 by transforming electric energy in kinetic energy or vice-versa. The energy transformation is achieved by two electric motor and/or generators 21 coupled to the flywheel 2, that are used to transfer/obtain energy to/from the flywheel 2 by consuming electricity to increase the rotation speed of the flywheel 2 or by making use of the rotating flywheel 2 to produce electricity, which, consequently, decreases the rotation speed of the flywheel 2.

The flywheel 2 and the two electric motor and/or generators 21 share a common shaft, making the rotation axis in each component coaxial with the other. Furthermore, the illustrated flywheel 2 is enclosed by a protective casing which minimizes interferences that might create friction and cause inefficiency, for example friction caused by dust. In most cases, air is removed from inside the protective casing so as to reduce the friction with the flywheel 2. The protective casing enclosing the flywheel 2 may thus be perceived as a protective chamber. The flywheel 2 is connected to the common shaft between the two electric motor and/or generators 21 and each electric motor and/or generator 21 is joined with the flywheel 2 by a frame 23 fixed to the protective casing, which provides a robust arrangement and keeps each electric motor and/or generator 21 in alignment with the common shaft.

The illustrated flywheel 2 for storing electric energy can be useful in various applications on a floating vessel 3. Due to the use of electric components, the installation of the flywheel can be made in various locations of the floating vessel 3, requiring only that the location is reachable by electric cables. An application of the flywheel 2 on a floating vessel 3 provides a general-purpose energy storage means for a power system in the floating vessel 3. Another application provides a flywheel 2 as an energy storing means for a lifting system in a floating vessel 3, the lifting system being controlled by a heave compensation system. In this particular example, the flywheel 2 may be used to store and supply electricity from/to the lifting system in an inverted manner, i.e.: when the lifting system lowers a load in reaction to an ascending heave, the flywheel 2 stores electric energy produced during the descent of the load; and, when the lifting system raises the load in reaction to a descending heave, the flywheel 2 supplies energy. In this example, a synchronous arrangement is observed between the operation of the flywheel 2 and the operation of the lifting system. The behaviour is based on the cyclical nature of the heave movements observed in a floating vessel. Thus, the synchronous behaviour here observed may be extended to other applications where the load providing and being supplied with energy from the flywheel 2 reveals a cyclical consumption/generation of electric energy. A further application of the flywheel 2 is to transfer electricity between different DC current buses in a vessel. For example, if there is one DC bus on each side of a vessel, the flywheel 2 may be used to transfer electricity from one side of the vessel to the other.

Due to its moment of inertia, the flywheel 2 opposes forces exerted on it to change the orientation of its rotation axis. In particular, the flywheel 2 opposes the forces exerted by floating vessel 3 in this respect, which can be provoked by the motion of the waves or the forces of wind surrounding the flywheel 2.

The apparatus 1 allows to counteract changes of orientation of the rotation axis of the flywheel 2, inflicted by the floating vessel 3. This is achieved by the apparatus manoeuvring the flywheel 2 relative to the floating vessel, when the floating vessel 3 attempts to change the orientation of the rotation axis of the flywheel 2. In this respect, manoeuvring is perceived as moving and/or turning the flywheel 2 relative to the floating vessel 3. Thus, although the flywheel 2 is still carried by the floating vessel 3, the apparatus 1 provides and makes use of additional degrees of freedom for the flywheel 2 relative to the floating vessel 3.

Figure 2:
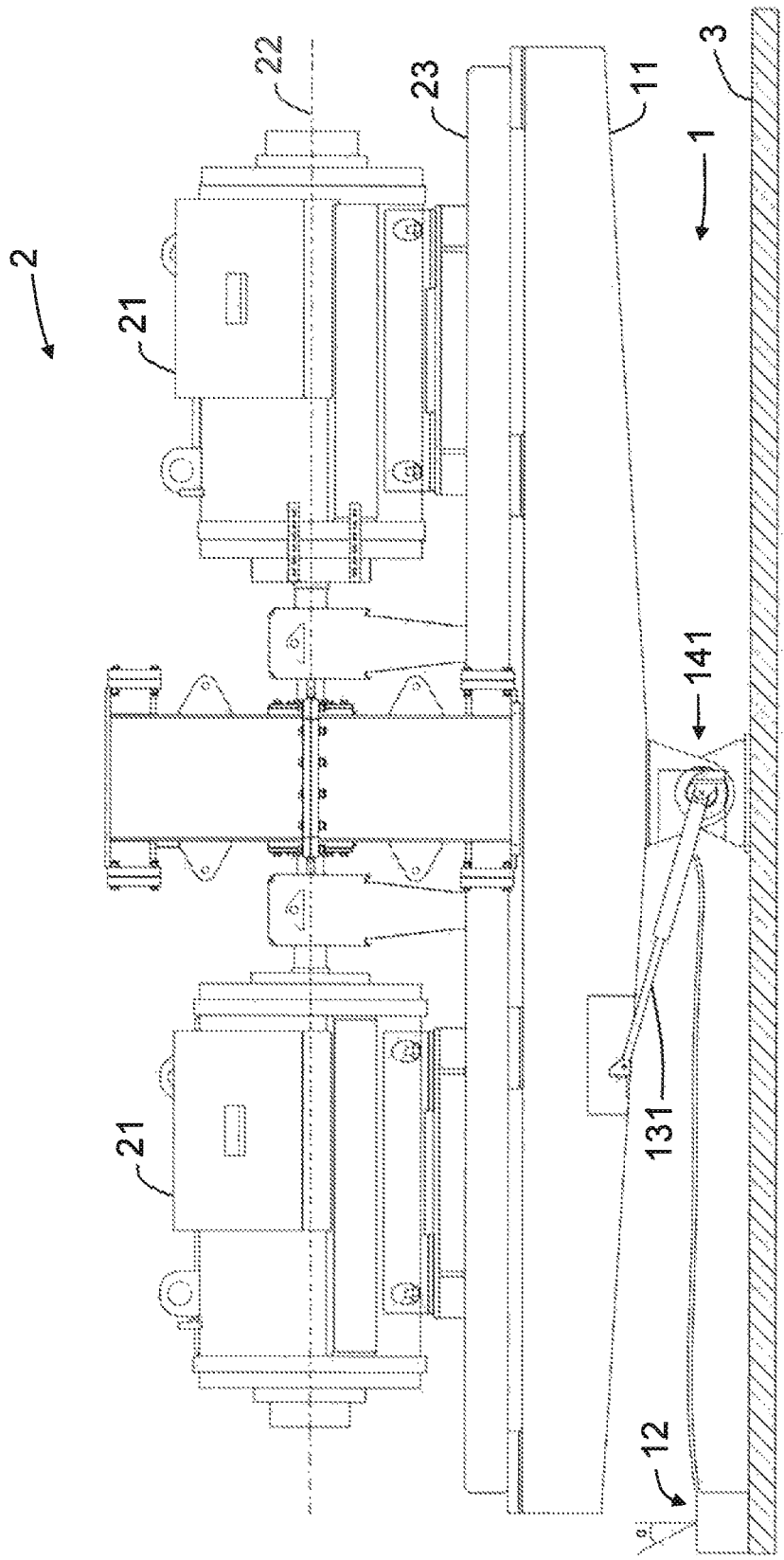
FIG. 2 is a schematic elevation view of the apparatus in FIG. 1.

FIG. 2, which is a schematic elevation view of the apparatus 1 in FIG. 1, will now be referred to.

The apparatus 1 manoeuvres the flywheel 2 relative to a floating vessel 3. This is provided by supporting the flywheel 2 in a support 11 and manoeuvring said support 11. The two electric motor and/or generators 21 and the frame 23 are also supported by the support 11.

In order to manoeuvre the support 11 relative to the floating vessel 3, the apparatus 1 includes a driver 131 which actuates on the support 11. Although the driver 131 is particularly illustrated as an extending member, such as a hydraulic or pneumatic cylinder, it can be implemented in various other ways, such as a robotic arm or by using at least one winch. Also, although one driver 131 is shown, a plurality of drivers can also be provided in the apparatus 1.

The apparatus 1 also includes a pivot shaft 141 on which the support 11 balances. The rotation axis 142 on which the pivot shaft 141 rotates, is illustrated as a dashed line in FIG. 1. Consequently, the flywheel 2 also pivots around the rotation axis 142. The pivot shaft 141 is not mandatory for the apparatus 1 and merely aids the driver 131 in manoeuvring the support 11. Other embodiments may provide the support 11 solely based on at least one driver 131, the at least one driver 131 serving the purposes of supporting and manoeuvring the support 11. For example, the support 11 may be supported by at least one extending member or suspended from at least one winch. In these embodiments, the possible manoeuvres would not be restricted to a rotation as is the case of the pivot shaft 141, allowing other manoeuvres such as linear and/or rotational manoeuvres.

The apparatus 1 further includes a tilt sensor 12 for measuring an angle of slope relative to the Earth. Particularly, the illustrated tilt sensor 12 is installed on the floating vessel 3 for measuring a longitudinal angle of slope. However, as will be described below, this particular installation may be replaced by an installation on other locations, such as on the support, as long as it allows to detect a change of an angle of slope of the floating vessel relative to the Earth. Also, although one tilt sensor 12 is provided in the embodiment, other tilt sensors could be further provided in the same apparatus 1, which would could achieve a measurement with more accuracy.

The components of the apparatus 1 work together to minimize changes of orientation of the rotation axis of the flywheel 2 imposed by the floating vessel 3. In order to manoeuvre the flywheel 2 relative to the floating vessel 3, the driver 131 actuates on the support 1 based on the measurements from the tilt sensor 12. In this respect, the driver 131 and the pivot shaft 141 are aligned with the tilt sensor 12. Thus, the measurements from the tilt sensor 12 are used as a basis for the actuation of the driver 131 on the support 11. For example, when the tilt sensor 12 transmits a measurement around the pitch axis of the apparatus 1, the driver 131 actuates based on that value by implementing a counteracting movement on the pitch axis of the support 11.

Figure 3:
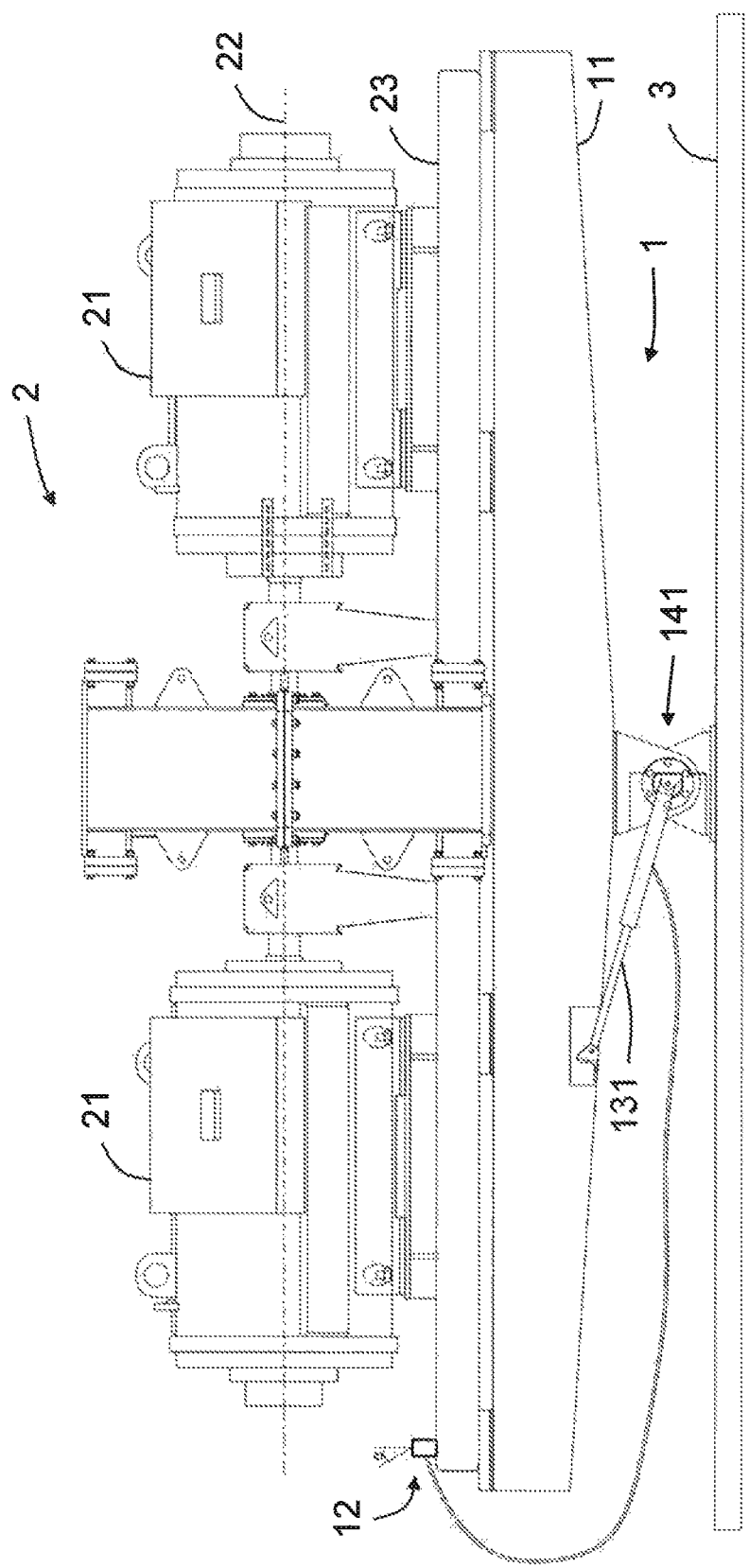
FIG. 3 is a schematic elevation view of another apparatus according to an another exemplary embodiment.

FIG. 3, which shows a schematic elevation view of an apparatus 1 of another exemplary embodiment, will now be referred to. This apparatus 1 is similar to the apparatus 1 shown in FIGS. 1 and 2 except for the positioning of the tilt sensor 12.

Instead of measuring the orientation of the floating vessel 3 relative to the Earth, the tilt sensor 12 may measure the orientation of the support 11 by being positioned on it. Although the support 11 is manoeuvred by the driver 131, a tilt sensor 12 positioned on the support 11 can be used to detect a change of an angle of slope of the floating vessel 3 relative to the Earth. It can be observed that a tilt sensor 12 positioned on the support 11 measures an angle of slope which is the sum of the angle of slope of the floating vessel 3 and the angle of slope of the support relative to the floating vessel. Still, a measurement in this scenario allows to detect a change of the angle of slope of the floating vessel 3 which, in turn, allows to manoeuvre the support 11 in an adequate manner for counteracting changes of orientation of the rotation axis of the flywheel 2.

In certain embodiments, the apparatus 1 may be installed on a floating vessel 3 so as to take into account the changes on the angle of slope that will most likely be imposed by the floating vessel 3. In particular, in a drillship, which has a length longer than its width, it will most likely be felt that the surrounding factors, e.g. motion of the waves and force of the wind, result on more pitch variations than on roll variations of the drillship. Thus, it is advantageous to provide a support 11 manoeuvrable in alignment with the direction in which the variations are expected to be felt the most. Also, it is advantageous to support a flywheel 2 with a rotation axis parallel to the pitch axis of the floating vessel.

In a particular embodiment, the apparatus 1 is provided including a pivot shaft 141 for turning the support 11 relative to the floating vessel 3, in which the pivot shaft 141 is arranged with a rotation axis 142 parallel to the roll axis of the floating vessel 3. This arrangement makes the apparatus particularly suitable for counteracting against pitch variations of the floating vessel 3. If a flywheel 2 is then supported with its rotation axis 22 parallel to the pitch axis of the floating vessel 3, the flywheel will be protected from roll variations since such variations do not change the orientation of its rotation axis 22.

The support 11 may be provided with appropriate marks or threaded holes for aligning a flywheel 2 with its rotation axis 22 parallel to the pitch axis of the floating vessel 3. For example, in embodiments in which the flywheel 2 is bolted to the support 11, the respective threaded holes may be arranged so that this alignment is achieved.

Thus, embodiments disclosed herein may have some or all of the following advantages:
  reduced fatigue imposed on the bearings of the flywheel due to movements of the floating vessel, in particular the ones provoked by the motion of the waves or by the force of the wind;
  higher maximum speed limits for running a flywheel safely in a floating vessel;
  increased capacity for storing energy on a flywheel on a floating vessel due to the increased maximum rotation speeds allowable for the flywheel;
  increased efficiency for storing and maintaining kinetic energy in the flywheel over time due to the reduced changes in the orientation of the axis of rotation of the flywheel;
  can be used with any existing flywheel without any special requirement for changing the flywheel;
  simple solution with few components;
  does not require that an entire floating vessel be constructed to accommodate at least certain embodiments disclosed herein, and can be installed in an already constructed vessel; and
  can adapt to an isotropic changes of angle of slope imposed by a floating vessel on a flywheel.

Generally, the terms used in this description and claims are interpreted according to their ordinary meaning in the technical field, unless explicitly defined otherwise. Notwithstanding, the terms "comprises" and "comprising" and variations thereof mean that the specified features, steps or integers are included, but these terms are not interpreted to exclude the presence of other features, steps or integers. Furthermore, the indefinite article "a" or "an" is interpreted openly as introducing at least one instance of an entity, unless explicitly stated otherwise. An entity introduced by an indefinite article is not excluded from being interpreted as a plurality of the entity.

While this disclosure has set out exemplary embodiments as described above, many equivalent modifications and variations will be apparent to those skilled in the art when given this disclosure. Accordingly, the embodiments of the disclosure set forth above are considered to be illustrative and not limiting. Various changes to the described embodiments may be made without departing from the spirit and scope of the invention that is defined by the claims set out below.

The invention claimed is:

1. An apparatus for storing and supplying electrical energy to at least one energy system on a floating vessel, the apparatus comprising:
  a flywheel configured to store electrical energy from and supply electrical energy to the at least one energy system;
  a support for the flywheel positioned on the floating vessel;
  at least one tilt sensor for measuring an angle of slope relative to the Earth, the at least one tilt sensor being configured to detect a change of an angle of slope of the floating vessel relative to the Earth;
  at least one driver coupled between the floating vessel and the support and configured to rotate the support relative to the floating vessel based on the measured angle of slope from the at least one tilt sensor; and
  at least one pivot shaft coupled between the support and the floating vessel so that the flywheel is pivotable around a rotational axis of the at least one pivot shaft, and wherein the support is configured to support the flywheel with a rotational axis of the flywheel perpendicular to the rotational axis of the at least one pivot shaft;
  wherein the at least one driver is configured to rotate, in response to the detected change of an angle of slope of the floating vessel, the support about the rotational axis of the at least one pivot shaft relative to the floating vessel, and to wherein the rotation of the support by the at least one driver in response to the detected change of an angle of slope of the floating vessel reduces deviations of an orientation of the rotational axis of the flywheel from a target orientation of the rotational axis of the flywheel relative to the Earth.

2. Apparatus according to claim 1, wherein at least one tilt sensor is configured to measure an angle of slope of the floating vessel relative to the Earth.

3. Apparatus according to claim 1, wherein at least one tilt sensor is configured to measure an angle of slope of the support relative to the Earth.

4. Apparatus according to claim 1, wherein at least one driver comprises an extending member to manoeuvre the support relative to the floating vessel.

5. A floating vessel, comprising the apparatus of claim 1.

6. A floating vessel according to the claim 5, wherein the driver is configured to manoeuvre the support relative to the floating vessel so that the manoeuvre is based on a rotation axis parallel to the roll axis of the floating vessel.

7. A floating vessel according to the claim 6, wherein the rotational axis of the pivot shaft is parallel to the roll axis of the floating vessel.

8. A floating vessel according to the claim 6, wherein the support is adapted to support the flywheel with a rotation axis parallel to the pitch axis of the floating vessel.

9. A floating vessel according to claim 5 wherein the floating vessel is a drillship.

10. Apparatus according to claim 1, wherein the rotational axis of the at least one pivot shaft extends through the pivot shaft.

11. Apparatus according to claim 1, wherein the rotational axis of the at least one pivot shaft extends centrally through the pivot shaft.

12. Apparatus according to claim 1, wherein the at least one driver is configured to rotate the support about the at least one pivot shaft relative to the floating vessel.

13. Apparatus according to claim 1, wherein the pivot shaft comprises an elongate shaft having a central axis coincident with the rotational axis.

14. A method for storing and supplying electric energy to at least one energy system on a floating vessel, the method comprising:
  supporting a flywheel by a support coupled between the flywheel and the floating vessel, the flywheel configured to store electrical energy from and supply electrical energy to the at least one energy system;
  measuring an angle of slope of the floating vessel relative to the Earth;

obtaining an angle of slope of the support relative to the floating vessel based on the measured angle of slope and on a target angle of slope for the support to obtain relative to the Earth; and rotating the support relative to the floating vessel about a rotational axis of at least one pivot shaft coupled between the support and the floating vessel, wherein the rotation of the support obtains the obtained angle of slope, and wherein the support is configured to support the flywheel with a rotational axis of the flywheel perpendicular to the rotational axis of the at least one pivot shaft.

15. Method according to claim 14, wherein the at least one driver is configured to rotate the support about the at least one pivot shaft relative to the floating vessel.

16. Method according to claim 14, wherein the rotational axis of the at least one pivot shaft extends through the pivot shaft.

17. A method for storing and supplying electric energy to at least one energy system on a floating vessel, the method comprising:

supporting a flywheel by a support coupled between the flywheel and the floating vessel, the flywheel configured to store electrical energy from and supply electrical energy to the at least one energy system;

measuring an angle of slope of the support relative to the Earth;

obtaining a change of angle of slope of the support, based on the measured angle of slope and on a target angle of slope for the support to obtain relative to the Earth;

rotating the support relative to the floating vessel about a rotational axis of at least one pivot shaft coupled between the support and the floating vessel, wherein the rotation of the support performs the obtained change of angle of slope, and wherein the support is configured to support the flywheel with a rotational axis of the flywheel perpendicular to the rotational axis of the at least one pivot shaft.

18. Method according to claim 17, wherein the at least one driver is configured to rotate the support about the at least one pivot shaft relative to the floating vessel.

19. Method according to claim 17, wherein the rotational axis of the at least one pivot shaft extends through the pivot shaft.

\* \* \* \* \*